UNITED STATES PATENT OFFICE 2,657,228

SULFONIC ACID ARYL ESTERS OF POLY-ARYLETHYLENE DERIVATIVES AND A PROCESS OF MAKING SAME

Heinrich Häusermann and Reinhard Zweidler, Basel, Switzerland, assignors to J. R. Geigy A. G., Basel, Switzerland, a Swiss firm No Drawing. Application March 5, 1951, Serial No. 214,014. In Switzerland August 13, 1948

12 Claims. (Cl. 260—456)

The present application is a continuation-in-part application of our co-pending application Ser. No. 109,223 filed on August 8, 1949, now abandoned.

The present invention provides new polyarylethylene derivatives containing sulfonic acid arylester groups as substituents as well as the method of their production.

It is known that 2.4-dinitrotoluene can be condensed with aromatic aldehydes under the influence of alkaline catalysts, such as piperidine, to give 2.4-dinitrostilbene derivatives. The production of 1.4-distyrylbenzene derivatives from terephthalaldehyde is also known. Furthermore, it has already been discovered that one of the nitro groups in 2.4-dinitrotoluene may be replaced by a cyano group and the nitrotolylnitrile obtained condensed with aromatic aldehydes to give the corresponding styrylbenzene derivatives. On the other hand the method fails when an attempt is made to replace one of the nitro groups in 2.4-dinitrotoluene by a sulfonic acid group so as to produce nitrostilbene-sulfonic acids, serving, e. g., as intermediates in the manufacture of dyestuffs, by condensation with aromatic aldehydes. When an attempt is made to weaken the acid nature of the sulphonic acid group by replacing one of the nitro groups in 2.4-dinitrotoluene by the sulfonamide group or to remove it altogether by using a sulfonic acid dimethylamide or a sulfonic acid alkyl ester group, the condensation with aromatic aldehydes still does not proceed in the desired direction or at most gives a yield which is uninteresting technically under the usual conditions and with the usual alkaline catalysts.

The surprising discovery has now been made that excellent yields of polyarylethylene derivatives substituted by sulfonic acid arylester groups can be obtained by condensing an aromatic aldehyde with a nitrotoluene derivative of the general formula:

wherein one of $X_1$ and $X_2$ stands for a nitro group and the other stands for a sulfonic acid arylester group, in the manner analogous to those already known from the literature, in the presence of basic catalysts, particularly secondary bases such as, e. g. piperidine, morpholine, dibutylamine and so on, and at an elevated temperature, for example 120–170° C. where necessary in the presence of high-boiling organic solvents taking no part in the condensation, such as, e. g., amyl alcohol, and finally saponifying the sulfonic acid arylester groups to the sulfonic acid groups.

The reaction takes place between the aldehyde group and the methyl group by splitting off water according to the equation:

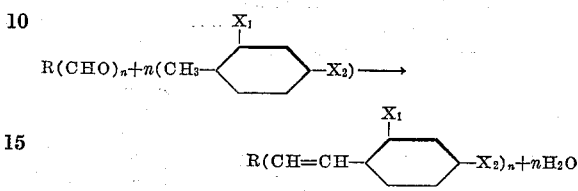

wherein
R stands for an aromatic radical,
$n$ represents one of the numbers 1 and 2, and
$X_1$ and $X_2$ have the meanings given above.

As examples of aromatic aldehydes suitable for the condensation may be mentioned: monoaldehydes with a nuclear bound aldehyde group such as benzaldehyde and nuclear substitution products thereof, also naphthaldehyde and dialdehydes such as terephthalaldehyde and isophthalaldehyde and so on.

Remarkably enough the stilbene condensation also takes place with the saponifiable nitrotoluene-sulfonic acid arylesters, e. g. with the 4- or 2-nitrotoluene-2- or 4-sulfonic acid aryl esters, whereby an excellent yield is obtained. The basic condensing agent does not cause any appreciable saponification thereby and does not lose its effectiveness. By subsequent saponification it is possible to prepare homogeneous and well-defined nitrostyryl sulfonic acids from the nitrostyryl sulfonic acid arylesters. As is known, the direct sulfonation of nitrostilbene derivatives gives products which are indefinite in composition.

The new nitrostyrylbenzene sulfonic acid arylesters are compounds which crystallise well. They can be recrystallised from suitable organic solvents, e. g., from nitrobenzene or glacial acetic acid and possess definite melting points. The corresponding nitrostyryl-sulfonic acids are intended for use as intermediates, for example, in the manufacture of dyestuffs.

The following examples illustrate the invention without restricting it however. Parts are by weight and temperatures in degrees centigrade. The relationship of parts by weight to parts by volume is that of kilograms to litres.

Example 1

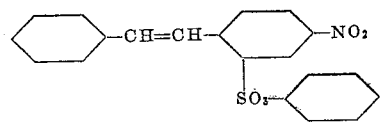

15 parts of 4-nitrotoluene-2-sulfonic acid phenyl ester and 3.8 parts of benzaldehyde are heated with 0.5 part of piperidine for one hour at 135–145°. Water is split off vigorously and the originally liquid reaction mixture solidifies to a yellow crystalline mass of 4-nitrostilbene-2-sulfonic acid phenylester. The product melts at 147° after recrystallising from glacial acetic acid. This yield amounts to 16 parts, i. e. 84% of the theoretical.

15.2 parts of this product are suspended in 320 parts of ethyl alcohol (95%) and heated to boiling. Then a solution of 3.2 parts of caustic soda in 8 parts of water is added dropwise in the course of an hour and boiling under reflux is continued for one to two hours until a sample shows water solubility. The mass is cooled down while stirring, drawing off, washed with cold alcohol and dried. The sodium salt of the sulfonic acid obtained forms yellow crystals which completely dissolve in hot water.

Example 2

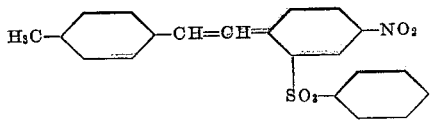

15 parts of 4-nitrotoluene-2-sulfonic acid phenylester are condensed with 6 parts of p-toluylaldehyde and 0.5 part of piperidine under the conditions described in Example 1. The reaction product obtained, 4-nitro-4'-methylstilbene-2-sulfonic acid phenylester crystallises from glacial acetic acid in light yellow needles melting at 142°. The yield amounts to 14 parts, i. e. 71% of the theoretical.

15.8 parts of this product are saponified according to the method described in Example 1, in order to obtain the sodium salt of the sulfonic acid.

Example 3

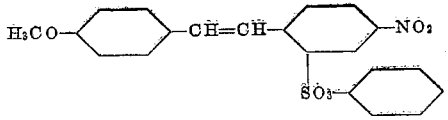

15 parts of 4-nitrotoluene-2-sulfonic acid phenylester and 6.8 parts of anisaldehyde together with 1 part of piperidine, are condensed as in Example 1. The product is 4-nitro-4'-methoxystilbene-2-sulfonic acid phenylester in the form of yellow crystals melting at 160°. The yield is 68% of the theoretical (5.5 parts).

16.4 parts of this product are saponified according to the method described in Example 1, in order to obtain the sodium salt of the sulfonic acid.

Example 4

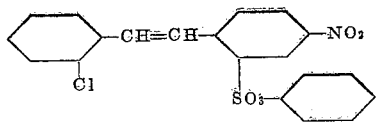

15 parts of 4-nitrotoluene-2-sulfonic acid phenylester and 7 parts of o-chlorobenzaldehyde are reacted in the presence of 1 part of piperidine as described in Example 1. The stilbene derivative thus obtained is purified by recrystallising from amyl alcohol. The product is 4-nitro-2'-chlorostilbene-2-sulfonic acid phenylester, the yield being 41%. The product is a faint yellow in colour and melts at 139°.

16.6 parts of this product are saponified according to the method described in Example 1, in order to obtain the sodium salt of the sulfonic acid.

Example 5

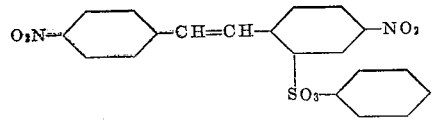

30 parts of 4-nitrotoluene-2-sulfonic acid phenylester and 15.1 parts of 4-nitrobenzaldehyde, together with 4 parts of piperidine are condensed as in Example 1, yielding 18.5 parts (43.4%) of 4.4'-dinitrostilbene-2-sulfonic acid phenylester with a melting point of 170°.

17.1 parts of this product are saponified according to the method described in Example 1, in order to obtain the sodium salt of the sulfonic acid.

Example 6

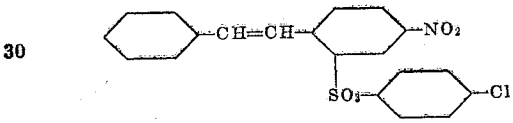

16.5 parts of 4-nitrotoluene-2-sulfonic acid-p-chlorophenylester when condensed with 5.3 parts of benzaldehyde in the presence of 0.8 part of piperidine as in Example 1, yield 16 parts (77%) of 4-nitrostilbene-2-sulfonic acid-p-chlorophenylester melting at 136°.

16.6 parts of this product are saponified according to the method described in Example 1, in order to obtain the sodium salt of the sulfonic acid.

Example 7

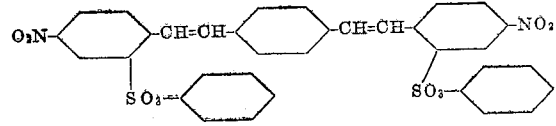

30 parts of 4-nitrotoluene-2-sulfonic acid-phenylester and 6.7 parts of terephthalaldehyde are condensed in the presence of 1.7 parts of piperidine under the conditions given in Example 1. The reaction product crystallises from a 1:1 mixture of nitrobenzene and glacial acetic acid as dark yellow prisms melting at 239–241°. The yield is 29 parts, i.e. 85% of the theoretical. The condensation product is a derivative of 1.4-distyrylbenzene and has the chemical constitution shown above. The dilute solutions of this product in nitrobenzene or dichlorobenzene are yellow and have a yellowish-green fluorescence.

27.4 parts of the distyryl derivative obtained are heated to 170° in 165 parts of ethylene glycol and a solution of 5.8 parts of potassium carbonate in 6 parts of water is added within 30 minutes while stirring. At the beginning of this operation the temperature of the oil-bath is kept at 220° and then allowed to cool down to 150–160°. Stirring is continued at this temperature until a clear, dark brown solution is obtained and a sample dissolves clearly in hot water. After cooling down to 120°, 8 parts of finely powdered potassium chloride are added and the mass is allowed to cool down to room temperature while stirring. The potassium salt of the new sulfonic acid, which forms orange red crystals is sucked off, washed with a 5% solution of potassium chloride until the filtrate is practically colorless and dried. The so-obtained potassium salt forms a red crystal powder which dissolves in hot water with an orange coloration.

*Example 8*

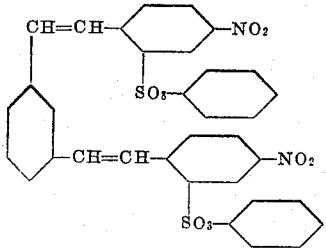

If the terephthalaldehyde in Example 7 is replaced by an equal amount of isophthalaldehyde when the corresponding derivative of 1.3-distyrylbenzene is produced, the yield being 54% and the melting point 210°. This compound is a much lighter yellow in colour than that described in Example 7 and also dissovles more readily in organic solvents.

It is saponified according to the method described in Example 7.

*Example 9*

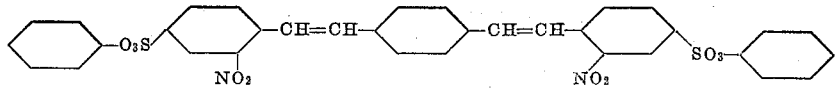

3.35 parts of terephthalaldehyde are condensed with 15 parts of 2-nitrotoluene-4-sulfonic acid phenylester in the presence of 0.8 part of piperidine under the conditions mentioned in Example 1 and the reaction product is recrystallised from 50 parts of nitrobenzene. 13 parts (76% of the theoretical) of 2'.2''-dinitro-1.4-distyrylbenzene-4'.4''-disulfonic acid phenylester are obtained in the form of dark yellow prisms melting at 255–256°.

It is saponified according to the method described in Example 7.

*Example 10*

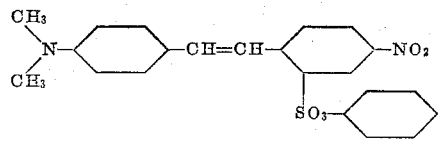

15 parts of 4-nitrotoluene-2-sulfonic acid phenylester, 7.5 parts of p-dimethylaminobenzaldehyde and 0.8 part of piperidine are heated for 30 minutes at 130–140° and the reaction product recrystallised from glacial acetic acid. The yield is 15 parts of 4-nitro-4'-dimethylaminostilbene-2-sulfonic acid phenylester in the form of dark, shining needles with a melting point of 160°.

17.0 parts of this product are saponified according to the method described in Example 1.

*Example 11*

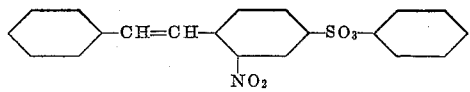

If the 4-nitrotoluene-2-sulfonic acid phenylester of Example 1 is replaced by the same amount of 2-nitrotoluene-4-sulfonic acid phenylester, then 2-nitrostilbene-4-sulfonic acid phenylester melting at 151° is obtained. The yield amounts to 62%.

15.2 parts of this product are saponified according to the method described in Example 1.

*Example 12*

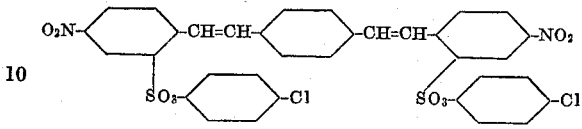

16.5 parts of 4-nitrotoluene-2-sulfonic acid-p-chlorophenylester are heated with 3.35 parts of terephthalaldehyde and 0.8 part of piperidine for 30 minutes at 134–145° and the dark mass obtained dissolved in hot nitrobenzene. On cooling, 11 parts of 4'.4''-dinitro-1.4-distyrylbenzene-2'.2''-disulfonic acid-p-chlorophenylester crystallise out. The product forms yellow prisms melting at 250°.

It is saponified according to the method described in Example 7.

*Example 13*

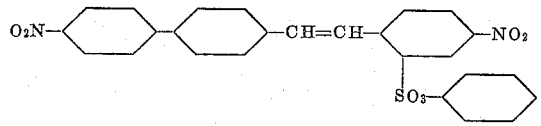

8.6 parts of 4-(4'-nitrophenyl)-benzaldehyde and 13 parts of 4-nitrotoluene-2-sulfonic acid phenylester are dissolved in 15 parts of nitrobenzene at 110° and mixed with 1 part of piperidine. The so-obtained mixture is heated up to 120–130°, whereupon water is split off under dark yellow coloration. After heating for one hour at 120–130°, 50 parts of glacial acetic acid are added. On cooling the reaction product, the 4-(p-nitrophenyl)-4'-nitrostilbene-2'-sulfonic acid phenylester separates in great, yellow crystals. Yield: 81%. Melting point: 201°.

In ultra-violet light and in daylight, the yellow solution of this new stilbene compound shows a yellow-green fluorescence.

If, in this example, the 8.6 parts of 4-(nitrophenyl)benzaldehyde are replaced by 6.9 parts p-phenyl-benzaldehyde, the 4-phenyl-4'-nitrostilbene-2'-sulfonic acid phenylester is obtained as yellow needles with a melting point of 195°. Yield: 79%.

20.1 parts of 4-(p-nitrophenyl)-4'-nitrostilbene-2'-sulfonic acid phenylester are saponified according to the method described in Example 7, but instead of 5.8 parts of potassium carbonate only 2.9 parts are used.

The potassium salt of the sulfonic acid obtained forms pale yellow needles.

*Example 14*

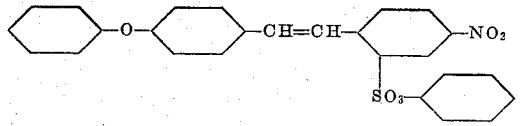

40 parts of p-phenoxybenzaldehyde, 70 parts of 4-nitrotoluene-2-sulfonic acid phenylester, 3 parts of piperidine and 50 parts of nitrobenzene are heated for an hour in an open vessel at 120–130°, 50 parts of glacial acetic acid are added. On cooling the reaction product, the 4-nitro-4'-phenoxystilbene-2-sulfonic acid phenylester crystallises in prisms with a melting point of 157°. Yield: 74%.

18.9 parts of this product are saponified according to the method described in Example 13.

Example 15

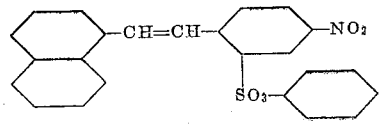

A solution of 23 parts of α-naphthaldehyde, 52 parts of 4-nitrotoluene-2-sulfonic acid phenylester and 3 parts of piperidine in 50 parts of nitrobenzene are heated in an open vessel for an hour at 125–135°, following which 50 parts of glacial acetic acid are added. The resulting reaction product crystallises in orange-yellow needles with a melting point of 160°. The liquid is drawn off. The residue is washed with glacial acetic acid and alcohol and dried in a vacuum above caustic soda at 80°. The yield of the new product, 4-nitro-2',3'-benzostilbene-2-sulfonic acid phenylester is 66%.

If, in this example, the α-naphthaldehyde is replaced by an equal quantity of β-naphthaldehyde, a yield of 84% 4-nitro-3',4'-benzostilbene-2-sulfonic acid phenylester with a melting point of 175° is obtained.

17.2 parts of this product are saponified according to the method described in Example 13.

Example 16

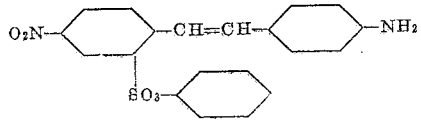

32.6 parts of p-acetylaminobenzaldehyde and 65 parts of 4-nitrotoluene-2-sulfonic acid phenylester are dissolved in 50 parts of nitrobenzene and after the addition of 3 parts of piperidine are heated for 1 hour at 120–130°. 100 parts of glacial acetic acid are added to the still hot, thick reaction product, and the whole is allowed to cool. Yellow crystals are formed with a melting point of 211°.

Yield of the phenylester of 4-nitro-4'-acetylaminostilbene-2-sulfonic acid: 80%.

17.5 parts of this product are saponified according to the method described in Example 1, whereby the sodium salt of 4-nitro-4'-aminostilbene-2-sulfonic acid is obtained.

Example 17

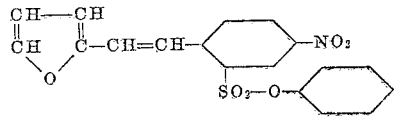

29.3 parts of 4-nitrotoluene-2-sulfonic acid phenylester are dissolved in 25 parts of nitrobenzene, 8 parts of furfural are added, then 1.5 parts of piperidine are stirred in and the whole is heated for 1 hour at 130–140°. Water is given off and the reaction mixture becomes dark brown. On completion of the reaction, 30 parts of glacial acetic acid and 20 parts of alcohol are added and the mixture is allowed to stand at 0–10° until after a few hours the reaction product precipitates in the form of dark needles. The new 2-(4'-nitro-2'-sulfonic acid phenylester-styryl)-furan is obtained by recrystallization from glacial acetic acid with the addition of animal charcoal. M. P. 142°.

Example 18

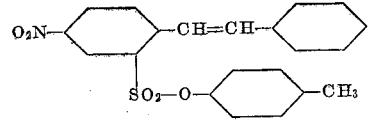

30.7 parts of 4-nitrotoluene-2-sulfonic acid-p-cresylester dissolved in 30 parts of nitrobenzene are heated in an open vessel at 125–135° which stirring with 10.6 parts of benzaldehyde and 2 parts of piperidine. Water is given off and the reaction mixture turns brown. On completion of the reaction, 60 parts of glacial acetic acid are added and the mixture is allowed to cool. The reaction product precipitates in the form of light yellow needles. M. P. 121°.

Example 19

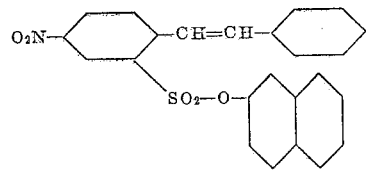

34.3 parts of 4-nitrotoluene-2-sulfonic acid-β-naphthyl ester and 10.6 parts of benzaldehyde are reacted and worked up in the manner described in Example 18. The reaction product is obtained in the form of dark yellow crystals which melt at 126°.

Example 20

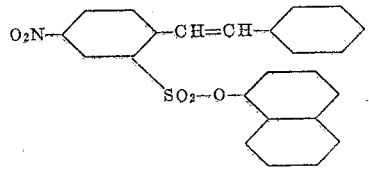

34.3 parts of 4-nitrotoluene-2-sulfonic acid-α-naphthyl ester and 10.6 parts of benzaldehyde are reacted and worked up in the manner described in Example 18. The reaction product is obtained in the form of yellow needles which melt at 157°.

Example 21

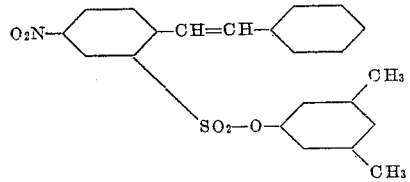

32.1 parts of 4-nitrotoluene-2-sulfonic acid-(3.5-dimethylphenylester) and 10.6 parts of benzaldehyde are reacted and worked up in the manner described in Example 18. The reaction product is obtained in the form of tiny yellow leaves which melt at 147°.

Example 22

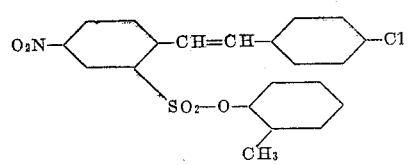

30.7 parts of 4-nitrotoluene-2-sulfonic acid-o-cresylester in 50 parts of nitrobenzene are heated in an open vessel at 125–135° while stirring with 14.0 parts of p-chlorobenzaldehyde and 2 parts of piperidine until about after an hour dehydration is completed. On completion of the reaction, 100 parts of glacial acetic acid are added to the dark yellow reaction mixture which is then allowed to cool. The new compound precipitates in the form of reddish-yellow crystals which melt at 139°.

*Example 23*

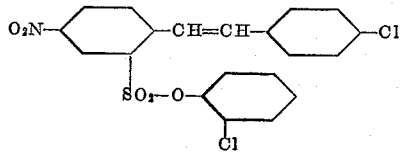

32.7 parts of 4-nitrotoluene-2-sulfonic acid-(o-chlorophenylester) and 14.0 parts of p-chlorobenzaldehyde are reacted in the manner described in Example 22. The new compound precipitates in the form of brownish needles which melt at 153°.

*Example 24*

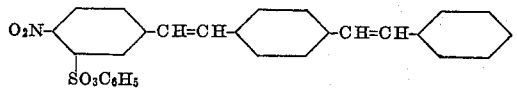

20.8 parts of 4-stilbene aldehyde (M. P. 113° produced from p-aminobenzaldehyde by diazotisation and reaction with cinnamic acid) and 29.3 parts of 4-nitrobenzene-2-sulfonic acid phenylester are condensed in 20.0 parts of nitrobenzene in the presence of 5.0 parts of piperidine in an analogous manner. The phenylester of 4-styryl-4'-(4''-nitro-2''-sulfostyryl)-benzene crystallises from glacial acetic acid in transparent orange-yellow crystals which melt at 169°. In a benzene solution they fluoresce an intense yellowish-green.

What we claim is:

1. Method for the production of a nitrostyryl sulfonic acid arylester which comprises heating a nitrotoluene sulfonic acid aryl ester of the general formula:

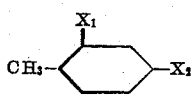

wherein one of $X_1$ and $X_2$ represents a nitro group and the other represents a sulfonic acid arylester group with an aromatic aldehyde at an elevated temperature above 100° C. in the presence of a secondary saturated amine as catalyst until condensation to the corresponding nitrostyryl sulfonic acid ester takes place.

2. Method for the production of a nitrostyryl sulfonic acid arylester which comprises heating a nitrotoluene sulfonic acid aryl ester of the general formula:

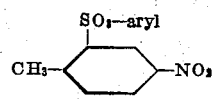

with an aromatic aldehyde at an elevated temperature above 100° C. in the presence of a secondary saturated amine as catalyst until condensation to the corresponding nitrostyryl sulfonic acid ester takes place.

3. A nitrostyryl sulfonic acid arylester of the formula:

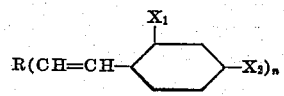

wherein R represents an aromatic radical, one of $X_1$ and $X_2$ represents a nitro group and the other represents a sulfonic acid arylester group and $n$ represents one of the integers 1 and 2.

4. A nitrostyryl sulfonic acid arylester of the formula:

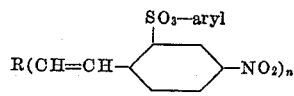

wherein R represents an aromatic radical, and $n$ represents one of the integers 1 and 2.

5. The compound of the formula:

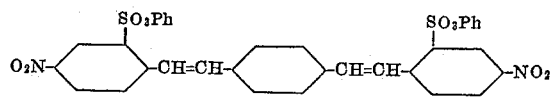

wherein Ph represents a radical of the benzene series.

6. The compound of the formula:

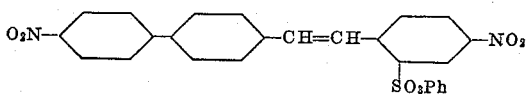

wherein Ph represents a radical of the benzene series.

7. The compound of the formula:

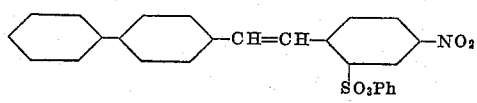

wherein Ph represents a radical of the benzene series.

8. The compound of the formula:

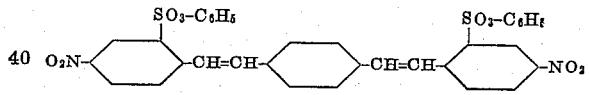

9. The compound of the formula:

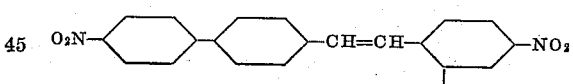

10. The compound of the formula:

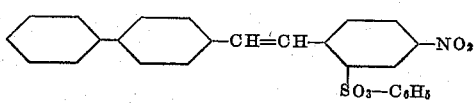

11. The compound of the formula:

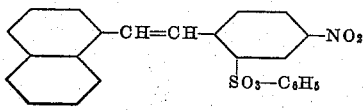

12. The compound of the formula:

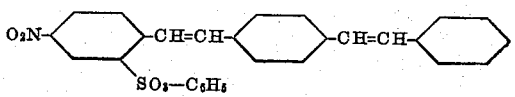

HEINRICH HÄUSERMANN.
REINHARD ZWEIDLER.

References Cited in the file of this patent

Ruggli et al., Helvetica Chimica Acta, vol. 9, page 936 (1926). See especially compound XXX. (Entire article comprises pages 929–950.)